US010121044B2

United States Patent
Jeong et al.

(10) Patent No.: US 10,121,044 B2
(45) Date of Patent: Nov. 6, 2018

(54) FINGERPRINT SENSOR

(71) Applicant: SAMSUNG ELECTRONICS CO., LTD., Suwon-si (KR)

(72) Inventors: Byunggil Jeong, Anyang-si (KR);
Cheheung Kim, Yongin-si (KR);
Jungwoo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 15/040,029

(22) Filed: Feb. 10, 2016

(65) Prior Publication Data

US 2017/0076131 A1 Mar. 16, 2017

(30) Foreign Application Priority Data

Sep. 16, 2015 (KR) .......... 10-2015-0131055

(51) Int. Cl.
*G06K 9/00* (2006.01)
(52) U.S. Cl.
CPC .................. *G06K 9/0002* (2013.01)
(58) Field of Classification Search
CPC .................................. G06K 9/0002
See application file for complete search history.

(56) References Cited

U.S. PATENT DOCUMENTS

| | | | |
|---|---|---|---|
| 5,953,441 A | 9/1999 | Setlak | |
| 6,462,563 B1* | 10/2002 | Kawahara | G06K 9/0002 324/662 |
| 7,768,273 B1* | 8/2010 | Kalnitsky | H01L 27/0248 324/661 |
| 9,360,971 B2* | 6/2016 | Barton | G06F 3/0488 |
| 2005/0024065 A1 | 2/2005 | Umeda et al. | |
| 2007/0221982 A1* | 9/2007 | Ikeda | H01L 27/115 257/314 |
| 2008/0303066 A1* | 12/2008 | Yonemochi | H01L 27/11519 257/208 |
| 2017/0147850 A1* | 5/2017 | Liu | G06K 9/0002 |
| 2017/0323147 A1* | 11/2017 | Zhan | G06K 9/00087 |

FOREIGN PATENT DOCUMENTS

| | | |
|---|---|---|
| JP | 4036798 B2 | 1/2008 |
| JP | 4233698 B2 | 3/2009 |
| JP | 5269111 B2 | 8/2013 |
| KR | 10-0672619 B1 | 1/2007 |

* cited by examiner

*Primary Examiner* — John Strege
(74) *Attorney, Agent, or Firm* — Sughrue Mion, PLLC

(57) ABSTRACT

A fingerprint sensor for reinforcing an electric field and preventing electric interference between adjacent electrodes. The fingerprint sensor includes a plurality of sensor electrodes provided on a substrate, an insulating layer, and a discontinuous grid formed in the insulating layer. The discontinuous grid includes a plurality of walls that are arranged in a two-dimensional (2D) manner. The plurality of walls are electrically insulated from each other.

18 Claims, 11 Drawing Sheets

FINGERPRINT SENSOR

RELATED APPLICATION

This application claims priority from Korean Patent Application No. 10-2015-0131055, filed on Sep. 16, 2015, in the Korean Intellectual Property Office, the disclosure of which is incorporated herein in its entirety by reference.

BACKGROUND

1. Field

Apparatuses and methods consistent with exemplary embodiments relate to a capacitance type fingerprint sensor, and more particularly to, a fingerprint sensor including an upper structure of a plurality of sensor electrodes.

2. Description of the Related Art

As the economy and society progresses, payment methods have been gradually developed, and new transaction methods such as credit card payment or electronic cash payment such as offline e-money have appeared. In addition, personal information management is emerging as a social issue. A security method, which is usually used, of entering a personal ID and password is insufficient to check personal information and maintain security.

Therefore, there is a need to detect a specific signal and decrypt the detected signal so as to check a personal identity while maintaining security when personal information is necessary. A security system usually uses an authentication method of recognizing personal bio features and comparing the recognized bio features and previously stored data. Among authentication methods using the personal bio features, a personal authentication method through a fingerprint sensor is the most commonly used. Fingerprint sensors have various merits in terms of ease of use, accuracy, price, effectiveness, etc.

Such fingerprint sensors are classified as capacitance, electromagnetic wave, and optical fingerprint sensors. Of these, a capacitance fingerprint sensor detects a fingerprint of an examinee by using a capacitance difference in fingerprint regions of the examinee.

SUMMARY

One or more exemplary embodiments provide fingerprint sensors for reinforcing an electric field and preventing electric interference between adjacent electrodes.

According to an aspect of an exemplary embodiment, there is provided a fingerprint sensor including a plurality of sensor electrodes provided on a substrate; a passivation layer provided on the plurality of sensor electrodes; an insulating layer arranged between the plurality of sensor electrodes and the passivation layer; and a discontinuous grid formed of a conductive material, arranged to surround each of regions of the insulating layer on the plurality of sensor electrodes, and electrically insulated from the plurality of sensor electrodes.

The discontinuous grid may include a plurality of floating conductor walls that are electrically insulated from each other.

The plurality of sensor electrodes may be arranged in a two-dimensional (2D) manner, and the discontinuous grid is arranged to one-to-one corresponding to the 2D arrangement of the plurality of sensor electrodes.

The discontinuous grid may be insulated at intersection points of the discontinuous grid.

A ratio of a height and a width of the discontinuous grid may be below 10:1.

The discontinuous grid may be arranged not to overlap with the plurality of sensor electrodes.

The discontinuous grid may be arranged to penetrate into the insulating layer.

The discontinuous grid may be arranged to partially overlap with the plurality of sensor electrodes.

An upper end of the discontinuous grid may be exposed to an upper surface of the insulating layer, and a lower end of the discontinuous grid may be located inside the insulating layer.

The insulating layer may include one of $Si_3$, $N_4$, and EMC (epoxy molding compound).

The conductive material may include at least one of Au, Ag, Cu, Pb, In, Sn, Cd, Al, ITO (indium tin oxide), IZO (indium zinc oxide), AZO (aluminum zinc oxide), and GZO (gallium zinc oxide).

The passivation layer may include a plurality of dielectric layers.

The discontinuous grid may penetrate into all or a part of the plurality of dielectric layers.

According to another aspect of the present disclosure, there is provided a fingerprint sensor including: a plurality of sensor electrodes provided on a substrate; a plurality of insulators respectively located on the plurality of sensor electrodes; and a plurality of floating conductor walls respectively surrounding the plurality of insulators and electrically insulated from each other.

The plurality of floating conductor walls may be arranged as a grid.

The plurality of floating conductor walls may be spaced apart from each other at intersection points of the grid arrangement.

According to another aspect of the present disclosure, there is provided a method of manufacturing a fingerprint sensor, the method including: providing a substrate; providing a plurality of sensor electrodes on the substrate; providing an insulating layer on the plurality of sensor electrodes; forming a discontinuous grid in the insulating layer such that the discontinuous grid surrounds each of regions of the insulating layer on the plurality of sensor electrodes and does not directly contact the of sensor electrodes; and providing a passivation layer on the insulating layer.

The forming of the discontinuous grid may include: etching the insulating layer and forming a grid pattern; and depositing a conductive material on the grid pattern.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1A:
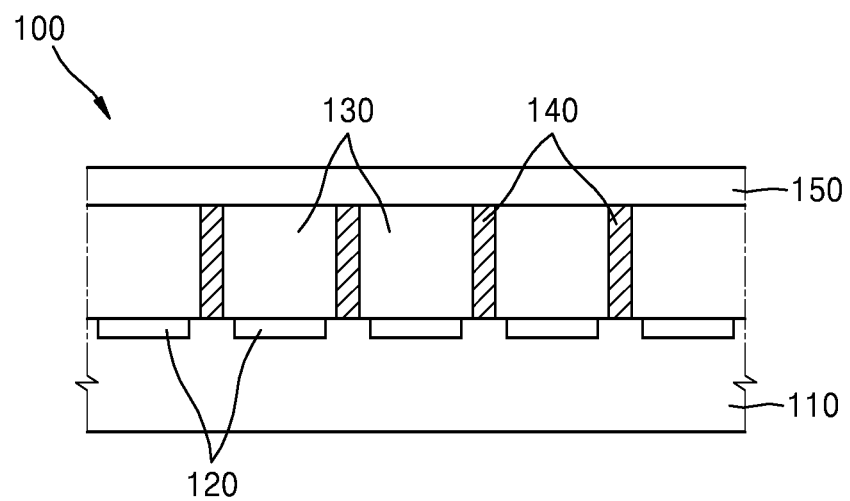
FIGS. 1A and 1B are schematic diagrams of a fingerprint sensor according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Figure 1B:
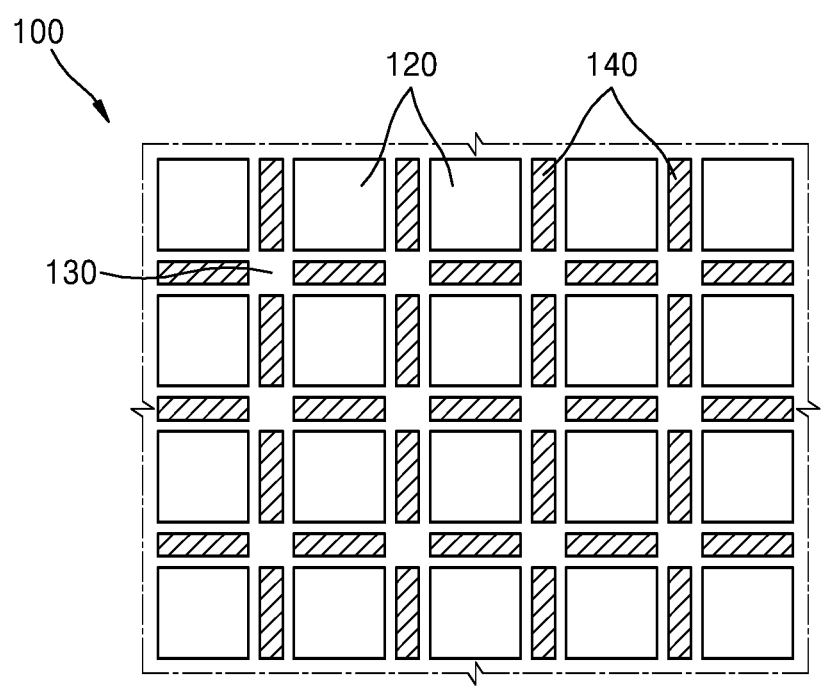
Figure 2:
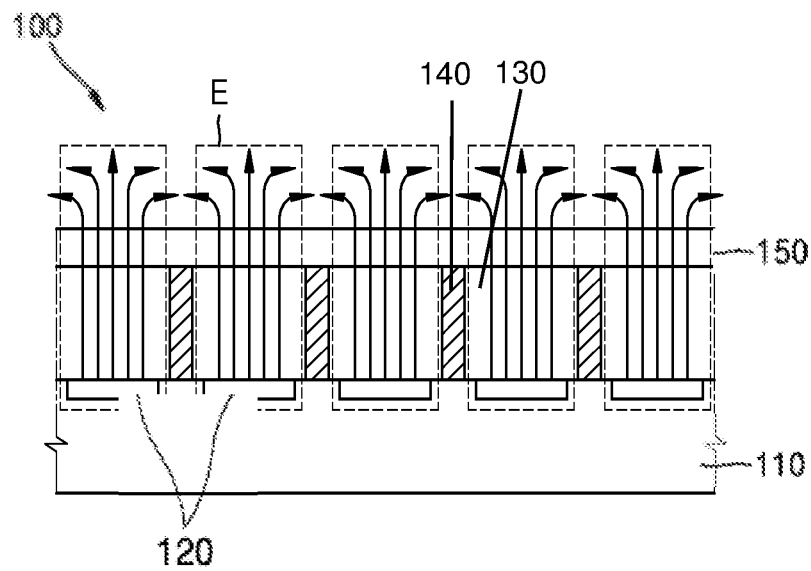
FIG. 2 is a schematic cross-sectional view for explaining a principle of the fingerprint sensor of FIG. 1.

FIGS. 1A and 1B are schematic diagrams of a fingerprint sensor 100 according to an exemplary embodiment. Referring to FIGS. 1 and 2, the fingerprint sensor 100 according to the present embodiment may include a plurality of sensor electrodes 120 provided on a substrate 110, an insulating layer 130 provided on the plurality of sensor electrodes 120, and a discontinuous grid 140 that is disposed to surround each of regions of the insulating layer 130 on the plurality of sensor electrodes 120 and is electrically insulated from the plurality of sensor electrodes 120.

The substrate 110 may be a silicon substrate. An integrated circuit that controls voltages applied to the plurality of sensor electrodes 120, measures capacitance, and performs a fingerprint recognition function may be provided on the substrate 110. For example, a circuit configured as a thin film transistor that individually switches the plurality of sensor electrodes 120 may be provided on the substrate 110. All integrated circuits for driving the fingerprint sensor 100 may be provided on the substrate 110. A detailed configuration of the integrated circuit is well known, and thus its detailed description is omitted.

The plurality of sensor electrodes 120 may include, for example, ITO (indium tin oxide) or may include at least one of ZnO based oxide such as IZO (indium zinc oxide), AZO (aluminum zinc oxide), and GZO (gallium zinc oxide), gold (Au), silver (Ag), copper (Cu), lead (Pb), indium (In), tin (Sn), or cadmium (Cd). The plurality of sensor electrodes 120 may be arranged on the substrate 110 in a 2D way. For example, a 2D arrangement may include a periodic arrangement in one direction and a periodic arrangement in a direction perpendicular to the one direction. The plurality of sensor electrodes 120 may have various shapes. For example, the plurality of sensor electrodes 120 may have a rectangular shape as shown in FIG. 1B, and may have a circular shape, an oval shape, and a polygonal shape. The plurality of sensor electrodes 120 may be individually controlled by an integrated circuit provided on the substrate 110. As described above, the integrated circuit may include a thin film transistor.

The insulating layer 130 may be provided on the plurality of sensor electrodes 120. The insulating layer 130 may reinforce intensity of an electric field formed between the plurality of sensor electrodes 120 and a fingerprint region. If the intensity of the electric field that reaches the fingerprint region of an examinee is reinforced, since a capacitance difference between a ridge region and a valley region may be increased, fingerprint recognition may be more accurately possible. The insulating layer 130 may include a high dielectric material including $Si_3$, $N_4$, and EMC (epoxy molding compound). The high dielectric material may have, for example, a dielectric constant more than 4 in an exemplary embodiment. When the insulating layer 130 includes the high dielectric material, an effect of reinforcing the intensity of the electric field may be relatively more excellent. In this regard, the insulating layer 130 may be regarded as a high permittivity layer. However, the insulating layer 130 may be formed of a low dielectric material and is not necessarily limited to the high dielectric material. The insulating layer 130 may include a plurality of insulators. The insulators may be provided on the plurality of sensor electrodes 120. Empty spaces may be present between the insulators.

The discontinuous grid 140 may be formed in the insulating layer 130. The discontinuous grid 140 may be disposed to surround each of the regions on the plurality of sensor electrodes 120 of the insulating layer 130. Alternatively, when the insulating layer 130 includes the plurality of insulators, the discontinuous grid 140 may surround each of the plurality of insulators. An arrangement of the discontinuous grid 140 may be determined according to an arrangement of the plurality of sensor electrodes 120. For example, when the plurality of sensor electrodes 120 has a 2D arrangement, the discontinuous grid 140 may have the 2D arrangement. The discontinuous grid 140 may be disposed to one-to-one correspond to the 2D arrangement of the plurality of sensor electrodes 120. When the discontinuous grid 140 is disposed to one-to-many correspond to the 2D arrangement of the plurality of sensor electrodes 120, a function of the discontinuous grid 140 may deteriorate. The discontinuous grid 140 may include a plurality of floating conductor walls. The floating conductor walls may be spaced apart from each other so that they may be electrically insulated from each other. The discontinuous grid 140 may have a structure that is insulated at an intersection point of the discontinuous grid 140. For example, in the discontinuous grid 140 having the 2D arrangement, the plurality of floating conductor walls may be disposed to be spaced apart from each other at the intersection point of the discontinuous grid 140. The electric field formed between the plurality of sensor electrodes 120 and the fingerprint region may pass through the insulating layer 130 surrounded by the discontinuous grid 140. In this regard, the discontinuous grid 140 may have a function of focusing the electric field and a function of shielding interference of the electric field. The focusing and shielding functions may be resulted from the floating conductor walls that are electrically insulated, that is, in a floating state. When all the floating conductor walls are electrically connected to form an equipotential surface, the intensity of the electric field may be rather weakened. Moreover, units of the floating conductor walls may horizontally cover each of the sensor electrodes 120 one by one, for example, vertical tube shaped floating conductor walls (see FIG. 9), and the units may be disconnected from each other. In the fingerprint sensor 100 that utilizes the plurality of sensor electrodes 120 as one pattern, one floating conductor wall that surrounds the entire pattern may be provided. For example, the entire discontinuous grid 140 may not have an electrically equipotential surface, and the units of the floating conductor walls may be different according to the fingerprint sensor 100. The discontinuous grid 140 may include, for example, ITO, or may include a ZnO based oxide such as IZO, AZO, and GZO. The discontinuous grid 140 may include metal such as gold (Au), silver (Ag), copper (Cu), lead (Pb), indium (In), tin (Sn), or cadmium (Cd).

A passivation layer 150 may be formed on the insulating layer 130 to protect the fingerprint sensor 100. The passivation layer 150 may be configured as a plurality of dielectric layers. The passivation layer 150 may include a color filter layer for an authentic effect.

A principle of the fingerprint sensor 100 according to the present embodiment will now be described. The fingerprint region of the examinee may be in contact with a surface of the passivation layer 150. The fingerprint region may be divided into ridge regions that are skin regions that relatively protrude from other peripheral skin regions and valley regions that are regions between the ridge regions. Each of the plurality of sensor electrodes 120 may measure capacitance from each of the plurality of sensor electrodes 120 to the fingerprint region as a pixel. The capacitance may be determined according to the following equation.

$$C = \varepsilon \frac{A}{d}$$

Capacitance C may be in inverse proportion to a distance d between two electrodes forming a parallel type capacitor and may be proportional to an area A of electrodes of the capacitor. Permittivity of a dielectric between the two parallel electrodes of the capacitor is denoted as ε. When the plurality of sensor electrodes 120 is one electrode of the capacitor, skin of the fingerprint region contacting the passivation layer 150 may function as another electrode. Thus, a distance from the skin to the plurality of sensor electrodes 120 may denote d in the equation above. The distance d from the skin to the plurality of sensor electrodes 120 may be changed according to the ridge regions and the valley regions, and thus the capacitance measured by each of the plurality of sensor electrodes 120 may be different according to the distance d. The capacitance difference may be used to make the fingerprint recognition possible. When the ridge regions are in contact with the passivation layer 150, the valley regions may not be in contact with the passivation layer 150 and may be spaced apart from the passivation layer 150. While the ridge regions are in contact with the passivation layer 150, spaces between the valley regions and the passivation layer 150 may be air. When the ridge regions are in contact with the passivation layer 150, since the distance from the skin to the plurality of sensor electrodes 120 is small, the capacitance may be great. When the valley regions are spaced apart from the passivation layer 150, since the distance from the skin to the plurality of sensor electrodes 120 is great, the capacitance may be small.

FIG. 2 is a schematic cross-sectional view of a principle of the fingerprint sensor 100 of FIG. 1.

Referring to FIG. 2, as described above, the discontinuous grid 140 may have a function of focusing an electric field E formed in the plurality of sensor electrodes 120. The discontinuous grid 140 may have a function of shielding interference of the electric field E of adjacent sensor electrodes. The electric field E formed in the plurality of sensor electrodes 120 may be indicated as an arrow in FIG. 2. The electrically floating discontinuous grid 140 may have a function of shielding electromagnetism to prevent the electric field E from leaking, and thus the electric field E may not leak and may be focused on a fingerprint region.

Figure 3:
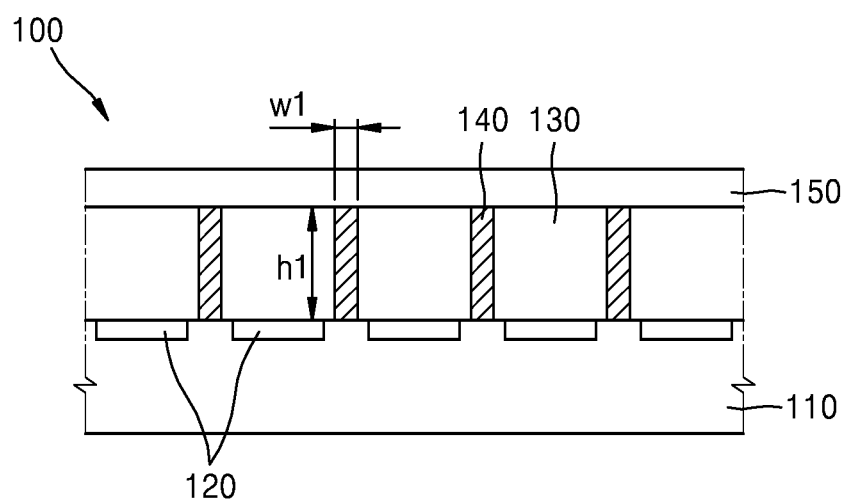
FIG. 3 is a cross-sectional view for explaining a condition regarding a discontinuous grid of the fingerprint sensor of FIG. 1.

FIG. 3 is a cross-sectional view of a condition regarding the discontinuous grid 140 of the fingerprint sensor 100 of FIG. 1. Referring to FIG. 3, the discontinuous grid 140 may penetrate into the insulating layer 130. When the discontinuous grid 140 is provided to penetrate into the insulating layer 130, a height h of the discontinuous grid 140 may be equal to or greater than a height of the insulating layer 130. The height means a thickness of a layer and indicates a length of a vertical line from a bottom surface to a top surface of the layer. When the discontinuous grid 140 is provided to penetrate into the insulating layer 130, one edge of the discontinuous grid 140 may not be in direct contact with the plurality of sensor electrodes 120. When the discontinuous grid 140 is in direct contact with the plurality of sensor electrodes 120, the discontinuous grid 140 may be electrically short-circuited. A ratio of a height $h_1$ and a width $w_1$ of the discontinuous grid 140 may be below 10:1. When ratio of the height $h_1$ and the width $w_1$ of the discontinuous grid 140 exceeds 10:1, since the width $w_1$ is smaller than the height $h_1$, it may be difficult to form the discontinuous grid 140 and reduce an effect of shielding electromagnetism at the same time.

Figure 4A:
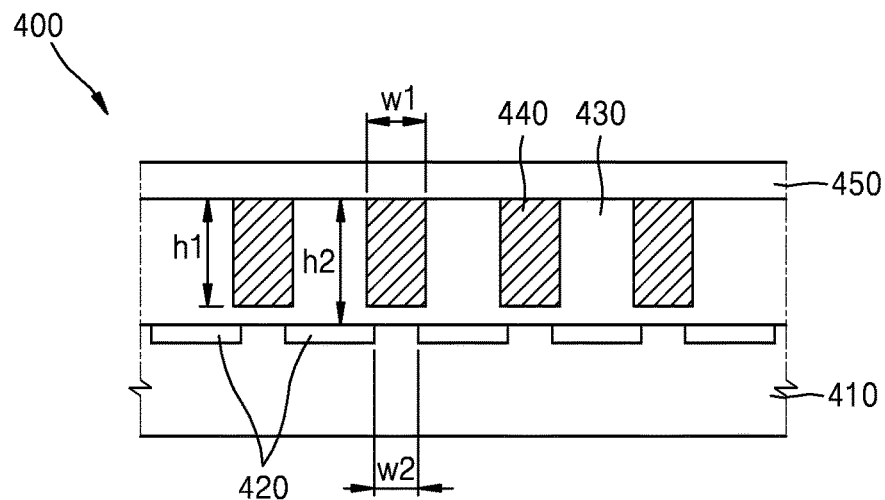
FIGS. 4A and 4B are schematic diagrams of a fingerprint sensor according to another exemplary embodiment.
Figure 4B:
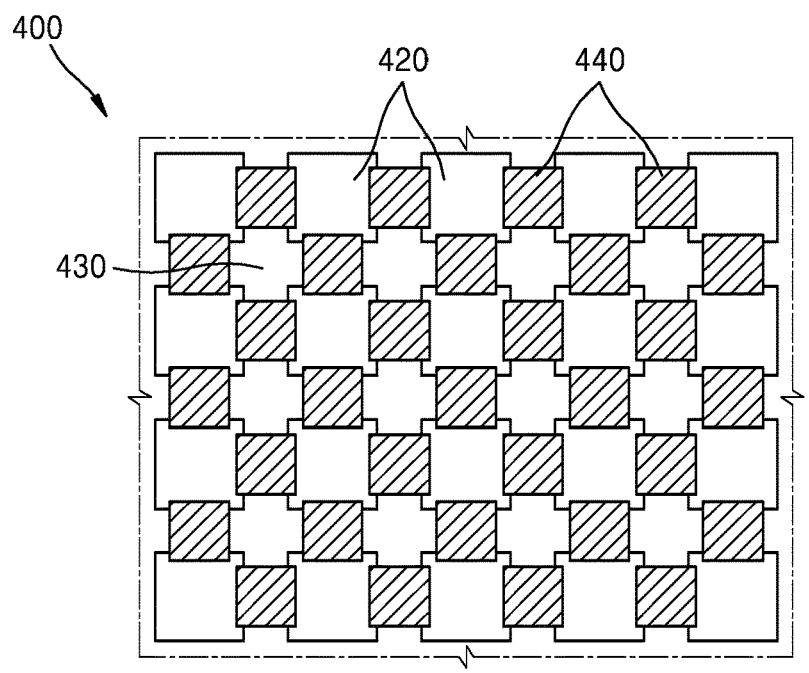

FIGS. 4A and 4B are schematic diagrams of a fingerprint sensor 400 according to another exemplary embodiment. Referring to FIG. 4A, the width $w_1$ of a discontinuous grid 440 of the fingerprint sensor 400 according to an exemplary embodiment may be greater than a distance w2 between ends of a plurality of sensor electrodes 420. In this case, to prevent the discontinuous grid 440 from directly contacting the plurality of sensor electrodes 420, a height $h_1$ of the discontinuous grid 440 may be smaller than a height $h_2$ of an insulating layer 430. Referring to FIG. 4A, an upper end of the discontinuous grid 440 may be exposed to an upper surface of the insulating layer 430, and a lower end of the discontinuous grid 440 may be located inside the insulting layer 430. Thus, a plurality of floating conductor walls constituting the discontinuous grid 440 may not penetrate into the insulating layer 430. The discontinuous grid 440 may be spaced from a substrate 410 by a length $(h_2-h_1)$ to prevent an electrical short circuit. Referring to FIG. 4B, a part of the discontinuous grid 440 according to the present embodiment may overlap with a part of the plurality of sensor electrodes 420. Overlapping two layers indicates a location relationship that a layer hides another layer when seen from an upper portion or a lower portion of the fingerprint sensor 400. Since the width $w_1$ of the discontinuous grid 440 is greater than the distance $w_2$ between the plurality of sensor electrodes 420, a part corresponding to $(w_1-w_2)$ of the discontinuous grid 440 may be located on the plurality of sensor electrodes 420. Even though the part of the plurality of sensor electrodes 420 overlaps with the discontinuous grid 440, intensity of an electric field may not be reduced. Thus, the width $w_1$ of the discontinuous grid 440 may be freely set within a range in which the intensity of the electric field is not greatly influenced.

Figure 5:
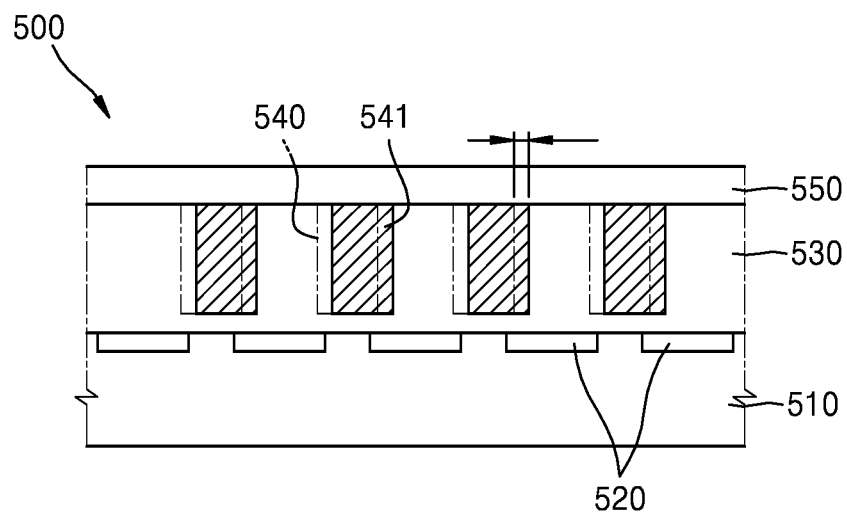
FIG. 5 is a cross-sectional view of a fingerprint sensor according to another exemplary embodiment.

FIG. 5 is a cross-sectional view of a fingerprint sensor 500 according to another exemplary embodiment. A location 540 of the discontinuous grid 440 of FIG. 4 is illustrated as a broken line in FIG. 5. A location 541 of a discontinuous grid of the fingerprint sensor 500 according to the present embodiment is illustrated as a solid line in FIG. 5. The location 540 of the discontinuous grid 440 illustrated as the broken line is a location corresponding to when the discontinuous grid 440 is correctly aligned with an arrangement of a plurality of sensor electrodes 520, whereas the location 541 of the discontinuous grid illustrated as the solid line is a location corresponding to when the discontinuous grid is misaligned with the arrangement of the plurality of sensor electrodes 520. Such a misalignment may be allowed within a range in which a width of each of the plurality of sensor electrodes 520 exceeds 50%. Even though a part of the plurality of sensor electrodes 520 is hidden, since intensity of an electric field may not be reduced, the location 541 of the discontinuous grid may be relatively freely provided on the plurality of sensor electrodes 520.

Figure 6:
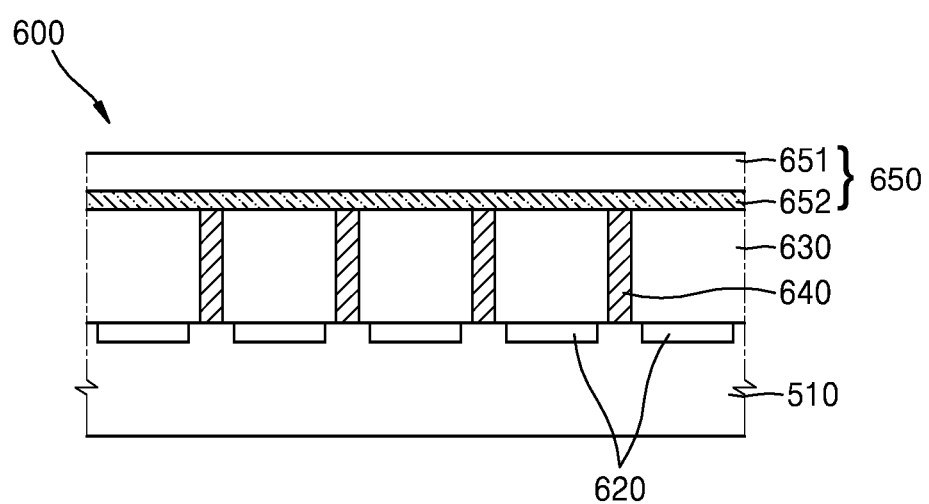
FIG. 6 is a cross-sectional view of a fingerprint sensor according to another exemplary embodiment.

FIG. 6 is a cross-sectional view of a fingerprint sensor 600 according to another exemplary embodiment. Referring to FIG. 6, a passivation layer 650 of the fingerprint sensor 600 according to the present embodiment may include a plurality of dielectric layers. For example, a dielectric layer 651 for protecting the fingerprint sensor 600 may be provided on an uppermost portion of the fingerprint sensor 600. The dielectric layer 651 may include glass. A color filter layer 652 for an esthetic function may be further provided on a lower portion of the dielectric layer 650. Other configurations of the fingerprint sensor 600 are the same as that of the fingerprint sensor 100 of FIG. 1, and thus a detailed description thereof is omitted.

Figure 7:
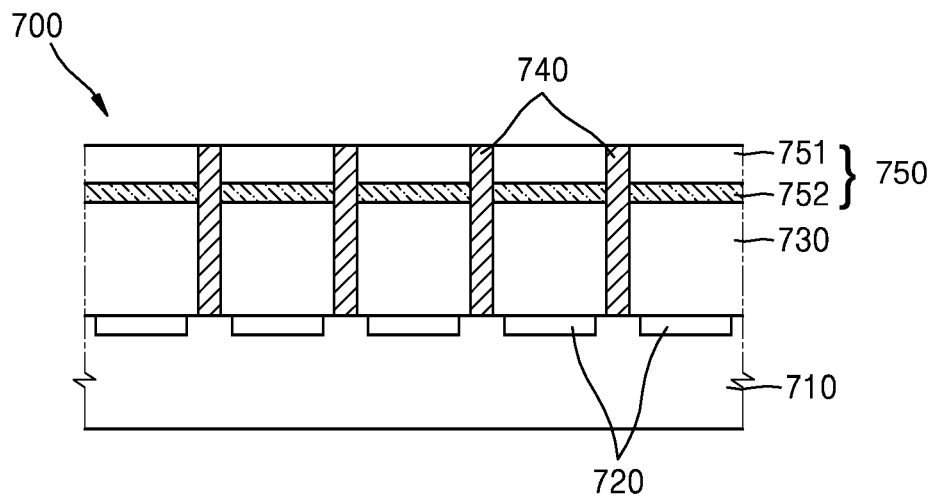
FIG. 7 is a cross-sectional view of a fingerprint sensor according to another exemplary embodiment.

FIG. 7 is a cross-sectional view of a fingerprint sensor 700 according to another exemplary embodiment. Referring to FIG. 7, a discontinuous grid 740 of the fingerprint sensor 700 according to the present embodiment may penetrate into a passivation layer 750. When the passivation layer 750 includes a plurality of dielectric layers, for example, dielectric layers 751 and 752 as shown in FIG. 7, the discontinuous grid 740 may penetrate into all or a part of the plurality of dielectric layers. Since a fingerprint region of an examinee is in contact with the passivation layer 750, if the discontinuous grid 740 is formed in the passivation layer 750, effects of focusing and shielding an electric field may be applied to the passivation layer 750. Thus, accuracy and efficiency of capacitance measurement may be increased. Referring to FIG. 7, one end of the discontinuous grid 740 may be exposed to a surface of the passivation layer 750. Since only ridge regions that are a part of the fingerprint region of the examinee are in direct contact with the passivation layer 750, a merely small part of the fingerprint region of the examinee may be in contact with the exposed end of the discontinuous grid 740 in the ridge regions. Thus, even through a small part of the discontinuous grid 740 is electrically connected, a function of the fingerprint sensor 700 may not deteriorate as a whole. Other configurations of the fingerprint sensor 700 are the same as that of the fingerprint sensor 100 of FIG. 1, and thus a detailed description thereof is omitted.

Figure 8:
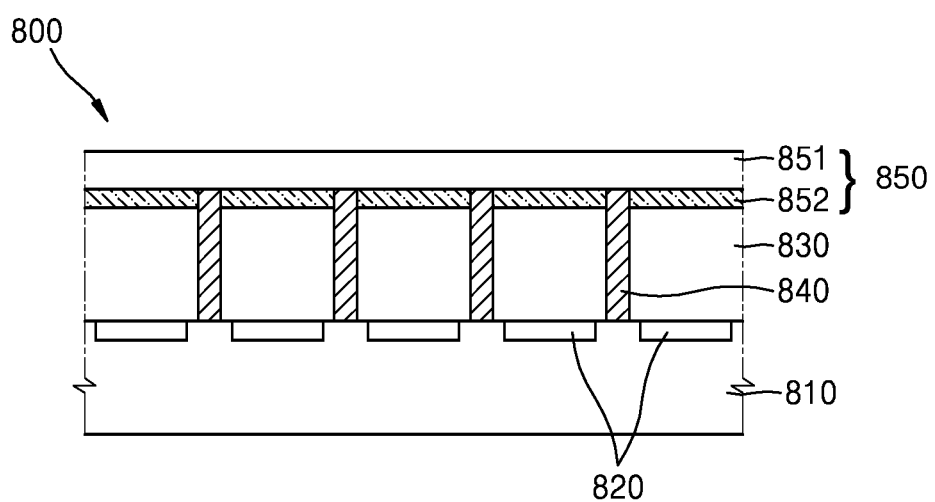
FIG. 8 is a cross-sectional view of a fingerprint sensor according to another exemplary embodiment.

FIG. 8 is a cross-sectional view of a fingerprint sensor 800 according to another exemplary embodiment. Referring to FIG. 8, a discontinuous grid 840 may penetrate into only a part of a plurality of dielectric layers 851 and 852. For example, the discontinuous grid 840 may not penetrate into the dielectric layer 851 located in an uppermost portion of the fingerprint sensor 800 and may penetrate into only the color filter layer 852 located in a lower portion of the dielectric layer 851. In this case, while effects of focusing and shielding an electric field may be improved, an electrical insulation of the discontinuous grid 840 may be maintained. The present embodiment is merely an example. The upper portion of the discontinuous grid 840 may be located inside the dielectric layer 851 or the color filter layer 852. Other configurations of the fingerprint sensor 800 are the same as that of the fingerprint sensor 100 of FIG. 1, and thus a detailed description thereof is omitted.

Figure 9:
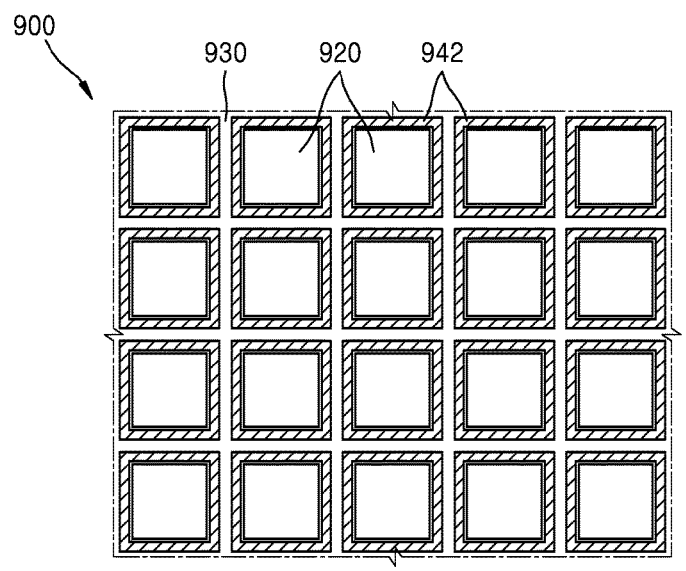
FIG. 9 is a cross-sectional view of a fingerprint sensor according to another exemplary embodiment.

FIG. 9 is a cross-sectional view of a fingerprint sensor 900 according to another exemplary embodiment. Referring to FIG. 9, the fingerprint sensor 900 according to the present embodiment may include a discontinuous grid 942 including a rectangular floating conductor wall that surrounds each of a plurality of sensor electrodes 920. The Floating conductor wall may be electrically insulated and arranged in a 2D way. The structure or the arrangement of the discontinuous grid 942 is merely an example and is not limited thereto. For example, the floating conductor wall surrounding each of the plurality of sensor electrodes 920 may have a triangular shape, a rectangular shape, a polygonal shape, a circular shape, and an oval shape. The floating conductor wall surrounding each of the plurality of sensor electrodes 920 may be a plurality of discontinuous floating conductor walls as shown in FIG. 1 or may be a single floating conductor wall. For example, the discontinuous grid 942 may focus an electric field of the plurality of sensor electrodes 920 and may satisfy a shape and an arrangement capable of shielding against the electric field of the plurality of sensor electrodes 920 adjacent to the discontinuous grid 942.

Figure 10:
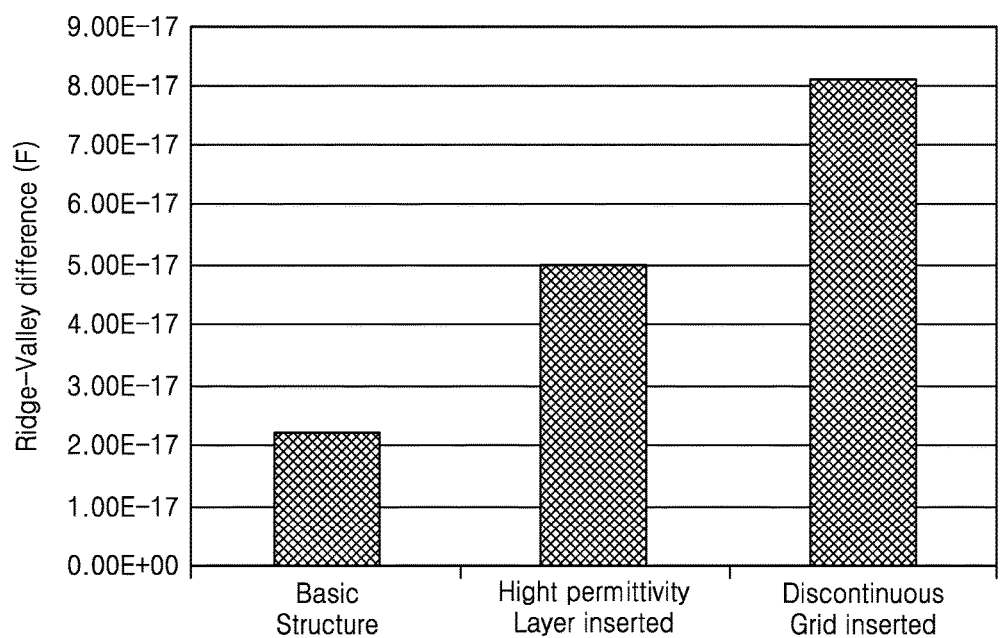
FIG. 10 is a graph representing performance of the fingerprint sensor of FIG. 1.

FIG. 10 is a graph of performance of the fingerprint sensor of FIG. 1. Referring to FIG. 10, the y axis indicates a capacitance difference between ridge regions and valley regions and has a unit of farad (F), and the x axis indicates three fingerprint sensors having a basic structure having no insulating layer, a structure only including an insulating layer, and a structure including a discontinuous grid. The capacitance difference with respect to the basic structure may be approximately $2 \times 10^{-7}$ F. The capacitance difference with respect to the structure only including the insulating layer may be approximately $5 \times 10^{-7}$ F. The capacitance difference with respect to the structure only including the discontinuous grid may be approximately $8 \times 10^{-7}$ F. Thus, if the insulating layer is provided in relation to the basic structure, the capacitance difference may be increased about 2.5 times, and, if the discontinuous grid is provided, the capacitance difference may be increased about 4 times. For example, considering that a height of the insulating layer is about 10 μm, and a height of the fingerprint sensor is about 150 μm, the insulating layer and the discontinuous grid may be efficient in improving performance of the fingerprint sensor.

Figure 11A:
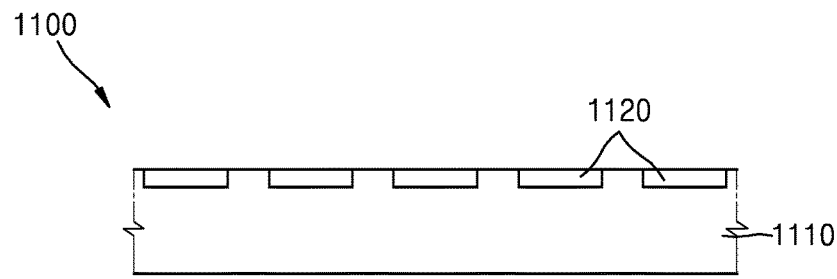
FIGS. 11A through 11G are cross-sectional views for describing a method of manufacturing a fingerprint sensor according to another exemplary embodiment.
Figure 11B:
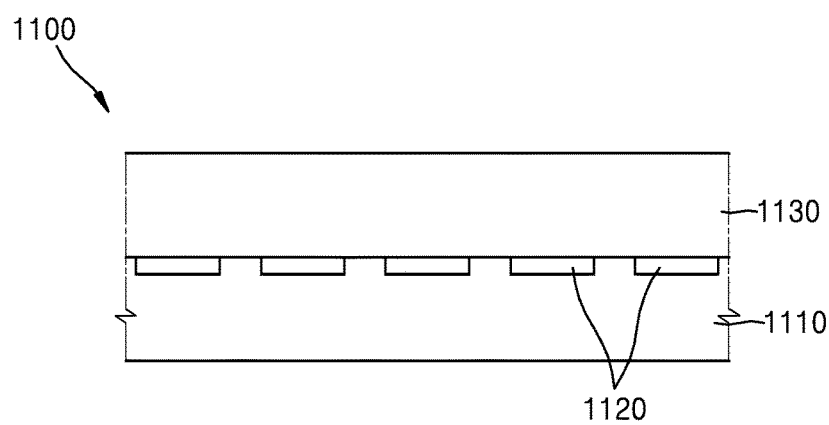
Figure 11C:
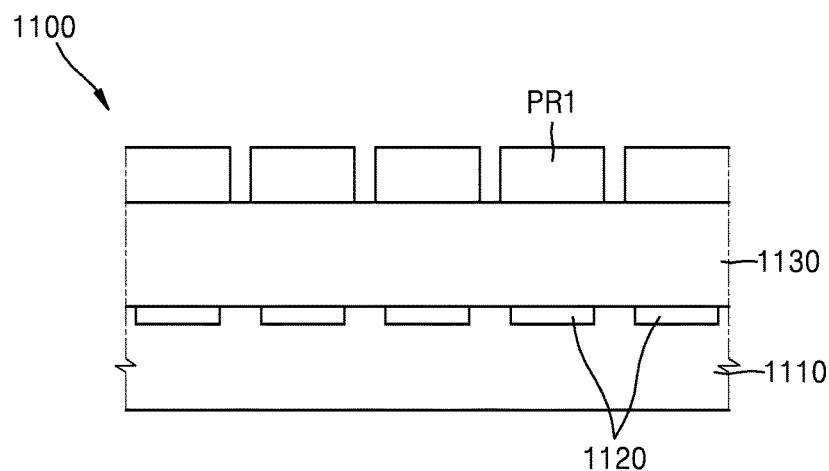
Figure 11D:
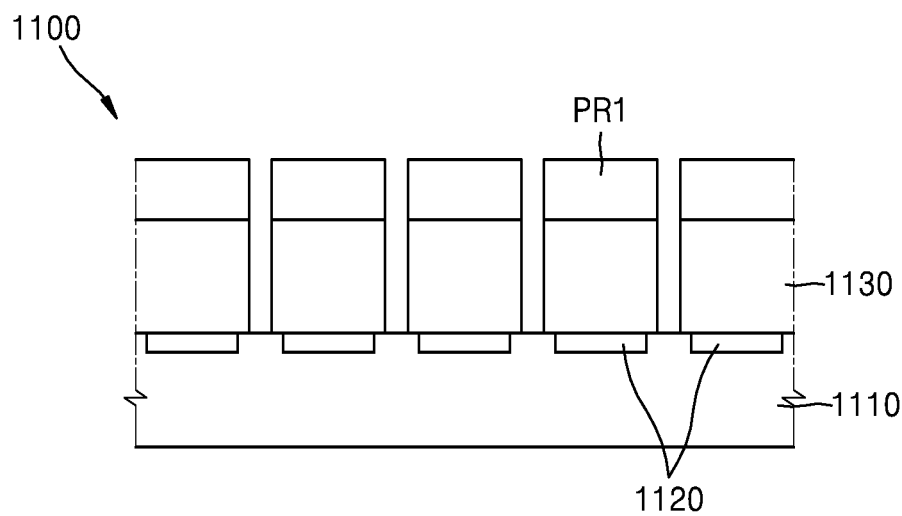
Figure 11E:
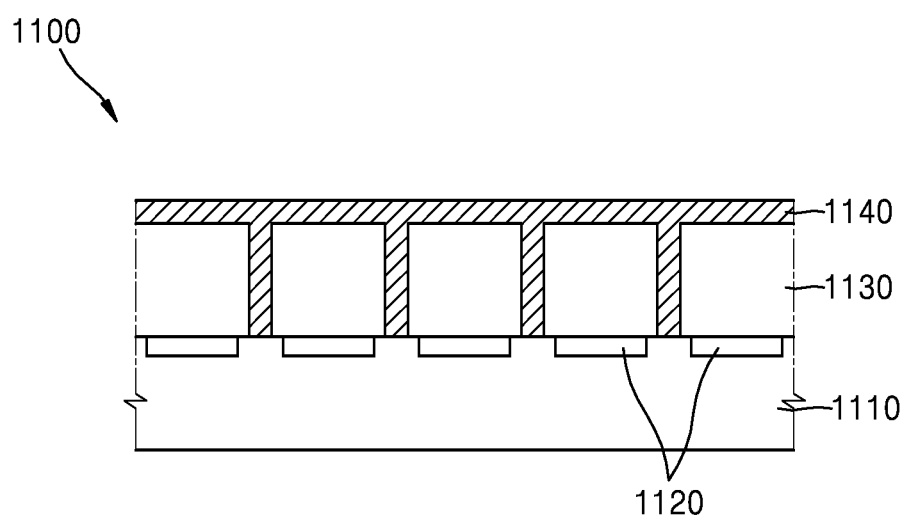
Figure 11F:
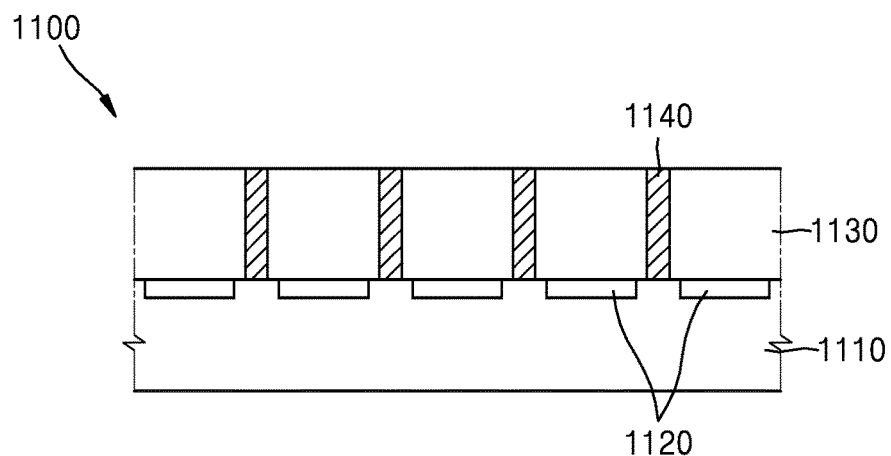
Figure 11G:
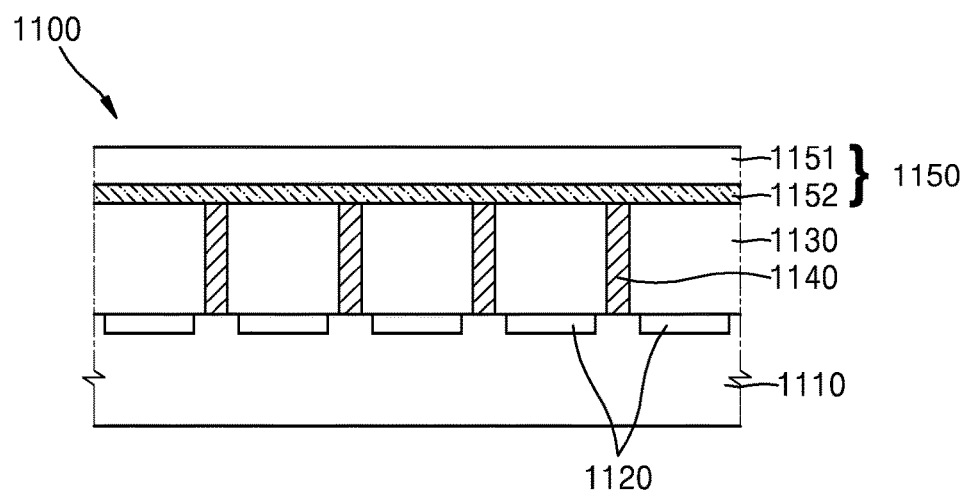

FIGS. 11A through 11G are cross-sectional views for describing a method of manufacturing a fingerprint sensor 1100 according to another exemplary embodiment. Referring to FIG. 11A, a substrate 1110 including a plurality of sensor electrodes 1120 may be provided. The substrate 1110 may include an integrated circuit for driving the fingerprint sensor 1100. The plurality of sensor electrodes 1120 may be arranged in a 2D way. The plurality of sensor electrodes 1120 may be arranged to have a uniform interval but is not limited thereto. Referring to FIG. 11B, an insulating layer 1130 may be provided on the plurality of sensor electrodes 1120. The insulating layer 1130 may be formed using spin coating or CVD method. Referring to FIG. 11C, a photoresist pattern PR1 may be provided on the insulating layer 1130. Referring to FIG. 11D, a grid pattern may be formed by etching the insulating layer 1130 using the photoresist pattern PR1 as a mask. For example, etching may be performed to penetrate through the insulating layer 1130 such that the substrate 1120 is exposed. When the etching is performed to penetrate through the insulating layer 1130, an etched part may not be in contact with the plurality of sensor electrodes 1120. As another example, a part of the insulating layer 1130 may be etched such that the substrate 1120 is not exposed. An etching method is not limited thereto, and may include, for example, dry etching. Referring to FIG. 11E, a conductive material may be deposited on the grid pattern of the insulating layer 1130. The conductive material deposited on the etched part of the insulating layer 1130 may be used to form a discontinuous grid 1140. The discontinuous grid 1140 may surround each of regions of the insulating layer 1130 on the plurality of sensor electrodes 1120. The discontinuous grid 1140 may not be in direct contact with the plurality of sensor electrodes 1120. Referring to FIG. 11F, an unnecessary part of the discontinuous grid 1140 may be removed. Referring to FIG. 11G, a passivation layer 1150 may be formed on the insulating layer 1130 and the discontinuous grid 1140. The passivation layer 1150 may include a plurality of dielectric layers. For example, the passivation layer 1150 may include a dielectric layer 1151 and a color filter layer 1152. The color filter layer 1152 may be provided on the insulating layer 1130. The dielectric layer 1151 may be provided on the color filter layer 1151.

Figure 12A:
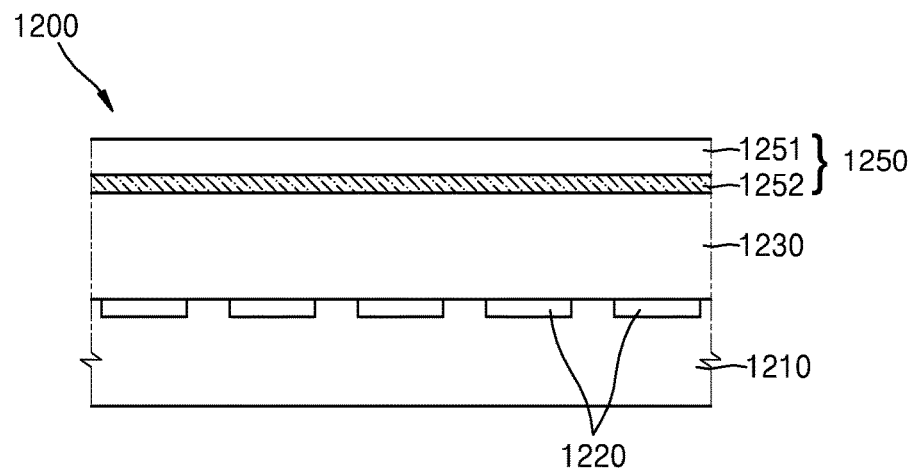
FIGS. 12A through 12D are cross-sectional views for describing a method of manufacturing a fingerprint sensor according to another exemplary embodiment.
Figure 12B:
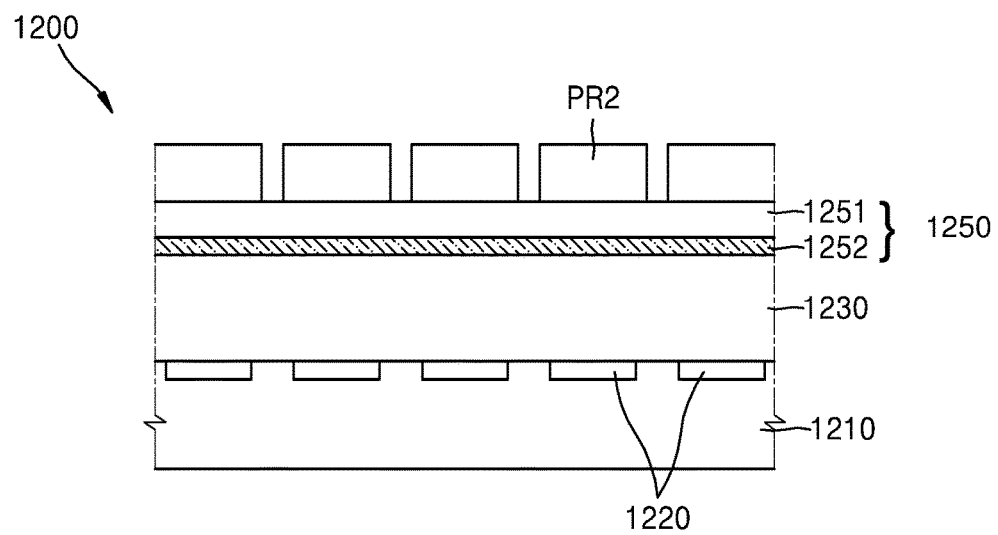
Figure 12C:
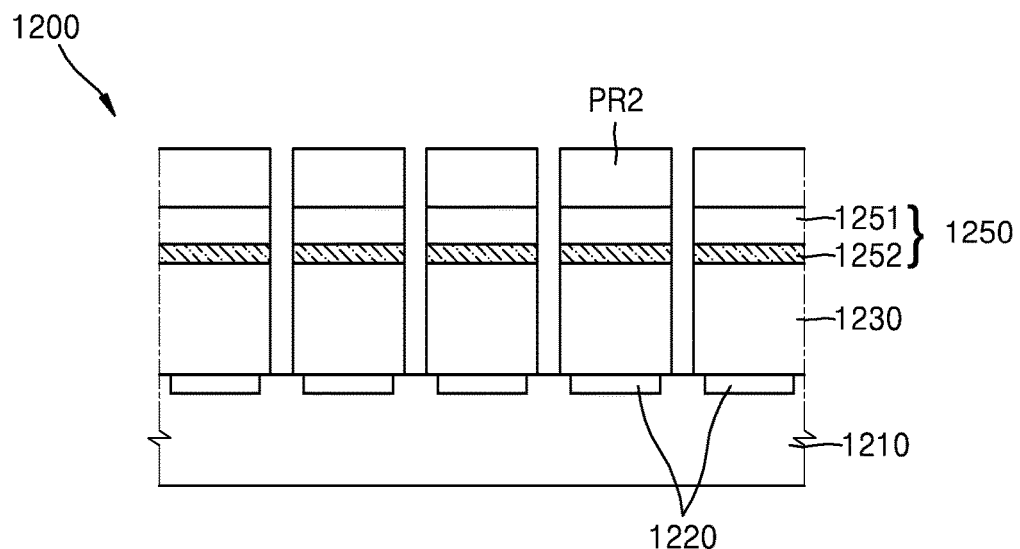
Figure 12D:
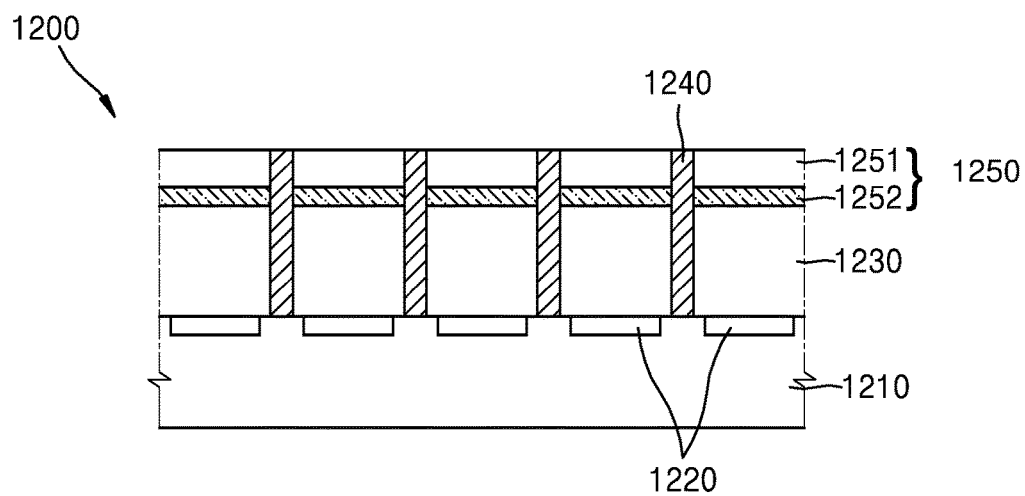

FIGS. 12A through 12D are cross-sectional views for describing a method of manufacturing a fingerprint sensor 1200 according to another exemplary embodiment. Differences between the method of FIGS. 12A through 12D and the method of FIGS. 11A through 11G will now be described and redundant descriptions are omitted. A discontinuous grid 1240 of the fingerprint sensor 1200 according to the present embodiment may penetrate into a passivation layer 1250. Referring to FIG. 12A, a substrate 1210 including a plurality of fingerprint sensors 1220 may be provided. An insulating layer 1230 and the passivation layer 1250 may be sequentially provided on the substrate 1210. The passivation layer 1250 may include a plurality of dielectric layers, for example, dielectric layers 1251 and 1252. The color filter layer 1252 may be provided on the insulating layer 1230, and the dielectric layer 1251 may be provided on the color filter layer 1252. Referring to FIG. 12B, a photoresist pattern PR2 may be formed on the dielectric layer 1251. Referring to FIG. 12C, a grid pattern may be formed by etching the passivation layer 1250 and the insulating layer 1230 using the photoresist pattern PR2 as a mask. Referring to FIG. 12D, the discontinuous grid 1240 may be formed by depositing a conductive material onto the grid pattern.

As described above, a fingerprint sensor of the present disclosure may include an insulating layer on sensor electrodes and a discontinuous grid formed of a conductive material. The discontinuous grid may reinforce an electric field formed in the sensor electrodes, thereby improving measurement efficiency of the capacitive fingerprint sensor. The discontinuous grid may also have a function of shielding interference between adjacent sensor electrodes and the electric field.

The exemplary embodiments of a fingerprint sensor have been described and shown in the accompanying drawings. However, it should be understood that such embodiments are merely intended to illustrate the present disclosure and not to limit the present disclosure. It should be also understood that the present disclosure is not limited to the illustrated and provided description. This is because various modifications may be made by those of ordinary skill in the art.

What is claimed is:

1. A fingerprint sensor comprising:
   a plurality of sensor electrodes provided on a substrate;
   a passivation layer provided on the plurality of sensor electrodes;
   an insulating layer arranged between the plurality of sensor electrodes and the passivation layer; and
   a discontinuous grid comprising a plurality of floating conductor walls that are electrically insulated from each other, the discontinuous grid arranged to surround each of regions of the insulating layer on the plurality of sensor electrodes, and electrically insulated from the plurality of sensor electrodes.

2. The fingerprint sensor of claim 1,
   wherein the plurality of sensor electrodes are arranged in a two-dimensional (2D) manner, and
   wherein the discontinuous grid is arranged to one-to-one correspond to the 2D arrangement of the plurality of sensor electrodes.

3. The fingerprint sensor of claim 1, wherein the discontinuous grid is insulated at intersection points of the discontinuous grid.

4. The fingerprint sensor of claim 1, wherein a ratio of a height and a width of the discontinuous grid is below 10:1.

5. The fingerprint sensor of claim 1, wherein the discontinuous grid is arranged not to overlap with the plurality of sensor electrodes.

6. The fingerprint sensor of claim 5, wherein the discontinuous grid is arranged to penetrate into the insulating layer.

7. The fingerprint sensor of claim 1, wherein the discontinuous grid is arranged to partially overlap with the plurality of sensor electrodes.

8. The fingerprint sensor of claim 7, wherein an upper end of the discontinuous grid is exposed to an upper surface of the insulating layer, and a lower end of the discontinuous grid is located inside the insulating layer.

9. The fingerprint sensor of claim 1, wherein the insulating layer comprises one of $Si_3N_4$, and EMC (epoxy molding compound).

10. The fingerprint sensor of claim 1, wherein the discontinuous grid comprises at least one of Au, Ag, Cu, Pb, In, Sn, Cd, Al, ITO (indium tin oxide), IZO (indium zinc oxide), AZO (aluminum zinc oxide), and GZO (gallium zinc oxide).

11. The fingerprint sensor of claim 1, wherein the passivation layer comprises a plurality of dielectric layers.

12. The fingerprint sensor of claim 11, wherein the discontinuous grid penetrates into all or a part of the plurality of dielectric layers.

13. A fingerprint sensor comprising:
    a plurality of sensor electrodes provided on a substrate;
    a plurality of insulators respectively located on the plurality of sensor electrodes; and
    a plurality of floating conductor walls respectively surrounding the plurality of insulators and electrically insulated from each other,
    wherein the plurality of floating conductor walls are physically separately arranged to form a discontinuous grid.

14. The fingerprint sensor of claim 13, wherein the plurality of floating conductor walls are spaced apart from each other at intersection points of the discontinuous grid.

15. A method of manufacturing a fingerprint sensor, the method comprising:
    providing a substrate;
    providing a plurality of sensor electrodes on the substrate;
    providing an insulating layer on the plurality of sensor electrodes;
    forming a discontinuous grid in the insulating layer such that the discontinuous grid surrounds each of regions of the insulating layer on the plurality of sensor electrodes and does not directly contact the plurality of sensor electrodes by arranging a plurality of floating conductor walls that are electrically and physically isolated from each other; and providing a passivation layer on the insulating layer.

16. The method of claim 15, wherein the forming of the discontinuous grid comprises:

etching the insulating layer and forming a grid pattern; and depositing a conductive material on the grid pattern.

17. The fingerprint sensor of claim 1, wherein the discontinuous grid is arranged to penetrate into the passivation layer.

18. The fingerprint sensor of claim 1, wherein the discontinuous grid is misaligned with the plurality of sensor electrodes.

* * * * *